Sept. 10, 1935. J. G. KNIGHT 2,013,964
ELECTRIC BUSHING, FIXTURE STUD, ETC
Filed March 20, 1931 2 Sheets-Sheet 1
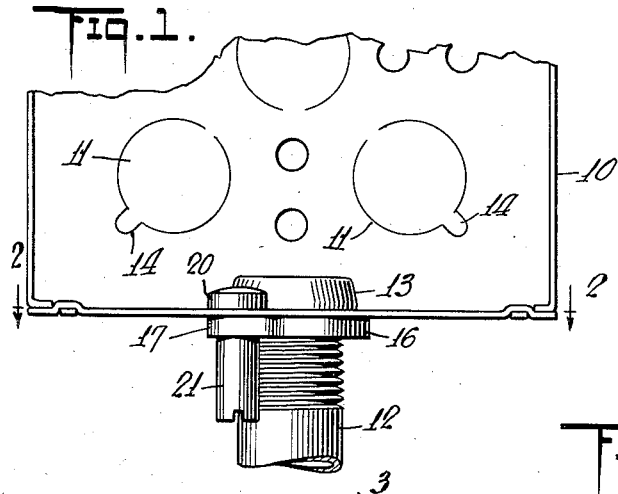
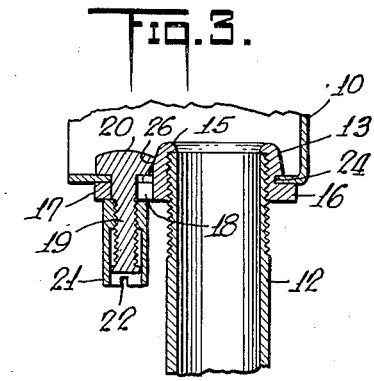
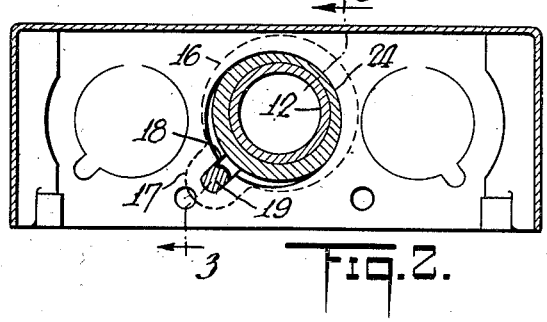
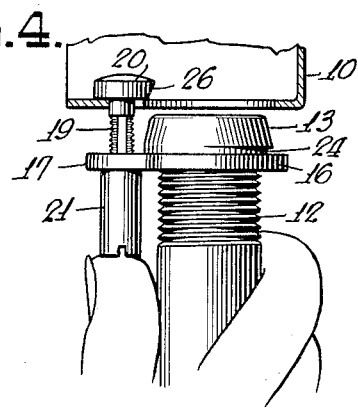
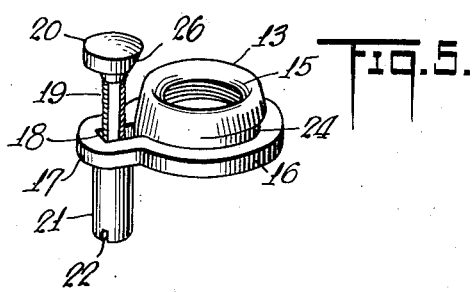
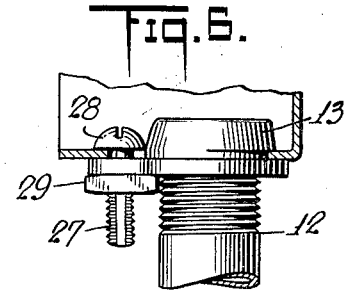
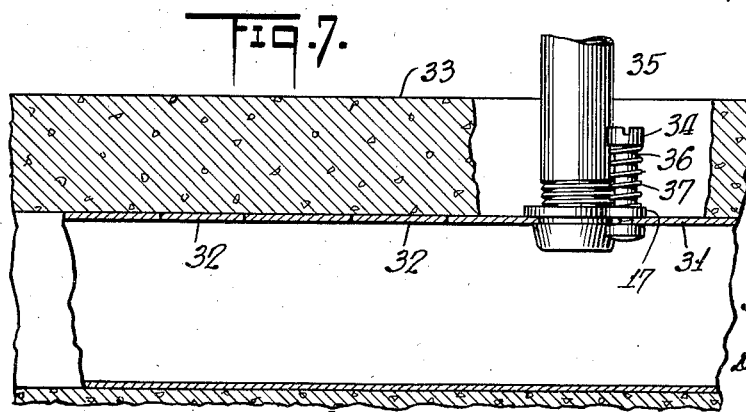
INVENTOR
Julian Gordon Knight
BY
ATTORNEYS

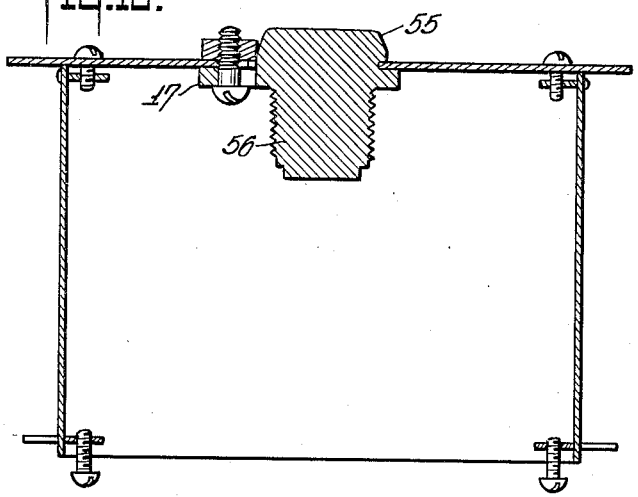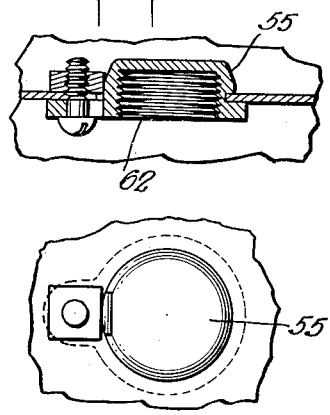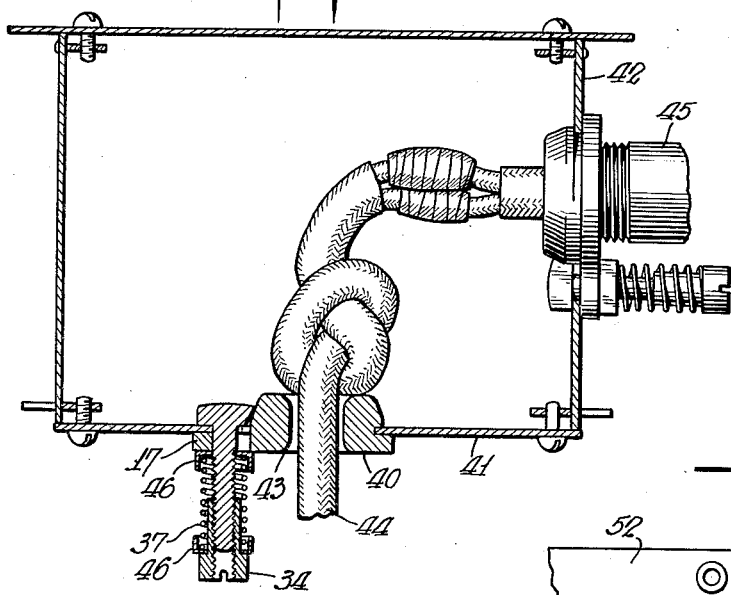

Patented Sept. 10, 1935

2,013,964

UNITED STATES PATENT OFFICE 2,013,964

ELECTRIC BUSHING, FIXTURE STUD, ETC.

Julian Gordon Knight, Brooklyn, N. Y.

Application March 20, 1931, Serial No. 523,999

7 Claims. (Cl. 247—25)

The invention relates to the art of electrical installation, and more particularly to a new and improved member adapted for attachment to the wall of a housing forming a part of an electrical installation.

The main objects of the present invention are to provide a device which is simple and reliable, which may be positively locked to the wall of an outlet box or other housing by simple manipulations, which has locking means which may be actuated solely from one side of the wall to which the device is to be secured, and to provide a device which projects to only a short distance from the surface of the wall.

In carrying out my invention, I provide my improved device with a movable member so designed and so mounted thereon that after the device has been inserted through an opening in the wall, said member may be manipulated in a simple and easy manner, to prevent further or return endwise movement in the opening, and preferably to lock said attachment rigidly in position. This device may be constructed to serve as a bushing for the attaching of a conduit to an outlet box or other housing, as a lining bushing for an opening through which a flexible conductor may extend or as a fixture stud.

In a preferred embodiment, the device has a transverse notch or groove to receive the edge of the wall, and the movable member is movable in a direction substantially at right angles to the wall at one side thereof to force said device laterally, cause the edge of the wall to enter said notch or opening, prevent return lateral movement of said device, and positively clamp the latter to the wall.

The locking member is preferably carried by a slotted lug or bearing, and has an inner head presenting a cam surface for engaging the side of the device to effect relative lateral movement of the device and its locking member when said member is moved endwise. Further endwise movement of said member causes the head thereof to engage the wall and clamp the parts against any relative movement.

My improved device may be employed to advantage as a conduit bushing. Hitherto, in attaching conduits to walls, such as those of junction boxes, outlet boxes, or the like, it has been common practice to screw a binding nut on the threaded end of the conduit, insert the end of the conduit through an opening in the wall, screw a bushing or stop nut on to the projecting end of the conduit on the other side of the wall, and then tighten the binding nut against the wall. This operation is a somewhat cumbersome one, and where the conduit is to be attached to an outlet box or the like, the limited space in the interior of the box makes access to the bushing inconvenient, and the manipulation of the parts difficult. Furthermore, in this type of construction, it is undesirable to have the conduit project more than the very minimum distance into the box, and the bushing is screwed on only a sufficient distance to barely retain it. The reverse rotation of the bushing or stop nut is resisted only by the frictional engagement of the binding nut and the bushing against the surfaces of the wall. Such a connection frequently becomes loosened, especially when subjected to the usual vibrations incident to building operations and constructions. Such disconnection becomes particularly undesirable where the conduit and the box wall forms part of a ground connection. Where the box is to be mounted on a form and later embedded in concrete, access to the interior of the box is particularly difficult, unless there is employed a special form of box with a removable cover such as shown in my prior Patent No. 1,302,057.

Also in this type of conduit connection means, the portion of the conduit opposite the periphery of the wall opening in the fixture has no threaded engagement and serves no purpose once the conduit and bushing are mounted in place. Therefore, to compensate for the unengaged portion of the conduit, it is necessary to provide a comparatively long threaded end to the conduit, and a correspondingly long bushing. In outlet boxes, the large space occupied by such a bushing in the interior of such a box is quite a disadvantage.

My invention may also be employed to advantage in a fixture stud adapted to be attached to the top wall of an outlet box to support an electric fixture. Hitherto, the fixture studs usually have been permanently riveted in place, or the boxes have been installed without studs. When the box is in place, the insertion of a stud or the replacement of an old one has been attended with a great deal of difficulty, and a fast and reliable connection between the stud and the wall has been a complicated procedure.

A device embodying my invention may be designed as a bushing or lining for the opening in the wall of a housing, and through which a flexible electric cord may extend. One end of the cord may carry a drop or portable light, or extend to any electric device. This cord may be knotted or have an abutment member connected thereto to prevent its passage through the bushing, and the hole through the bushing may be smooth and flared at its end to prevent cutting of the insulation on the cord.

In the accompanying drawings, there are shown for purposes of illustration, several devices adapted for different specific purposes, and each embodying the invention. In the drawings Fig. 1 is a fragmentary inverted plan view of an outlet box with an improved conduit bushing in set position.

Fig. 2 is a section taken on line 2—2 of Fig. 1.

Fig. 3 is a section taken on line 3—3 of Fig. 2.

Fig. 4 is a plan view of the conduit bushing of Fig. 1, but shown in one of its preliminary assemblying positions with respect to the outlet box.

Fig. 5 is a perspective view of the conduit bushing shown in Fig. 1.

Fig. 6 is a view partly in section of another form of conduit bushing.

Fig. 7 is a vertical longitudinal section through an under floor conduit having a different form of bushing.

Fig. 8 is a vertical section through an outlet box showing two bushings, one adapted to support a flexible electric cord.

Fig. 9 is a plan view of the bushing shown in Fig. 8.

Fig. 10 is a vertical section through a ceiling conduit with bushings of the type shown in Figs. 7 and 8 attached thereto.

Fig. 11 is an inverted plan view partly in section of the ceiling conduit shown in Fig. 10.

Fig. 12 is a vertical section through an outlet box having a male fixture stud connected thereto and constructed in accordance with my invention.

Fig. 13 is a section similar to a portion of Fig. 12, but showing a female fixture stud embodying the invention, and Fig. 14 is a plan view of the fixture studs shown in Figs. 7 and 8.

In Figs. 1 to 5 there is shown a common form of electric outlet box 10, having a plurality of knockout openings 11, any one or more of which serve for receiving the threaded end of a conduit 12. It differs from the usual box in that each opening has a notch 14 at one side thereof. The end of the conduit is threaded in the usual manner for engagement in the internally threaded bore of a conduit bushing 13, and the bushing has an inwardly extending annular flange 15 at the inner end which acts as a shoulder or stop for the end of the conduit 12. The bushing end and flange are rounded to provide a non-abrading surface with which the circuit wires may contact, and the flange prevents the sharp edge of the conduit wall from contacting with the wires.

My invention is here shown as incorporated in the bushing which has radially extending from the periphery thereof at one end a flange 16 which at one side is provided with a lug or extension 17 having a slot 18. The body of the bushing is smaller than the hole 11, so as to enter the latter, but the flange is larger so as to form a stop and seat against the wall of the box. The bushing adjacent to the inner surface of the flange 16 and diametrically opposite to the lug 17 is provided with a peripheral groove or notch 24 of a size and character to receive the edge of the wall in an opening of which the bushing is to be secured, and to permit the lateral movement of the bushing in one direction after the bushing has been inserted.

A screw bolt 19 is mounted in the slot 18, and is provided with a head 20 which engages the periphery of the bushing 13 when said bolt is in the position shown in Figs. 1 and 3. Either the side of the bolt head or the side of the bushing or both are inclined to form a cam surface operating as hereinafter described. The bolt 19 has a nut 21 on the other end, and is advantageously upset so as to prevent the detachment of the nut 21 from said bolt, a portion of the bore of said nut being unthreaded and enlarged to slidably receive the upset end of said bolt.

The notch 14 is of a width substantially equal to the diameter of the bolt, and is of such depth that when the bolt 19 engages the outer end of said notch, the bushing can be disposed substantially coaxially with the opening 11, as shown in Fig. 4.

The length of the screw bolt 19 is preferably such that the underside of the head 20 can be spaced beyond the inner end of the bushing 13 a distance at least equal to the thickness of the wall of the outlet box 10, so as to permit the entry of the bolt 19 into engagement with the notch 14 without the necessity of axially tilting said bolt or said bushing. However, the screw bolt 19 fits fairly loosely in the slot 18, thereby permitting a certain amount of relative axial tilting between said bolt and the bushing. This serves to facilitate the setting of the conduit bushing in the outlet box.

In effecting a connection between the conduit 12 and the outlet conduit box 10, the bushing 13 is screwed on to one end of said conduit so that the end flange 15 abuts the end of the conduit. The nut 21 is loosened so that the bolt head may be disposed beyond the end of the bushing when the nut is in engagement with the outer surface of the lug 17, as shown in Figs. 4 and 5. This shifting of the bolt 19 is easily effected by grasping the conduit in the hand with the thumb pressing the nut 21 into contact with the lug 17. The head of the screw bolt 19, while disposed in this position with respect to the bushing, is inserted through the opening 11 and shifted into the notch 14, as shown in Fig. 4.

After the parts have been brought to this position, the bushing 13 is shifted axially into the opening 11 until the flange 16 abuts the outer surface of the wall of the box 10. The periphery of this bushing may be tapered towards its inner end to facilitate its passage through said opening. The screw bolt 19 is then moved axially until the head 20 abuts the inner surface of the wall of the box. During this shifting operation, the side of the bolt head 20 engages the periphery of the bushing, and due to the inclined or cam surface and the abutting of the bolt 19 against the outer end of the notch 14, the bushing 13 is shifted laterally away from said notch until the groove 24 receives the wall of the outlet box.

It is advantageous to provide the bolt head 20 with a tapered surface 26 which acts as a cam surface, and which cooperates with the tapered surface of the bushing, so as to facilitate the axial shifting of the bolt 19, and the simultaneous transverse movement of said bushing 13. In order to prevent the rotational displacement of this cam surface 26 with respect to this bushing, the slot 18 is advantageously made rectangular in shape, and the bolt 19 provided with opposite plane surfaces to prevent its rotation.

After the head 20 has been seated against the inner face of the wall, the nut 21 is turned until it abuts the lug 17, as shown in Figs. 1 and 3. In this position, the bushing 13 will be held in locked position with respect to the outlet box, the locking at one side being by the slot 24, and at the other side by the bolt 19.

In cases where one end of a conduit has already been anchored in position and it is desired to effect the connection of the other end of said conduit to an outlet box or the like, it is desirable to provide the opening 11 with a plurality of spaced peripheral notches 14. In this way, the screw bolt 19 may be set into the nearest notch with the minimum turning of the conduit. This provision of a plurality of spaced notches is also advantageous in cases where the end of the conduit to be connected to the box is curved from the main portion thereof, and where little turning of this conduit from a predetermined position is permissible.

In some cases, the opening in the wall need not have any slot at one side, but instead the opening may be circular and enough larger than the bushing so that the slot 24 and bolt 19 may engage diametrically opposite sides of the opening when the bushing is in locked position. In this case, the bushing is not positively locked against rotation.

Sometimes it is advantageous to effect tightening of the screw bolt from the inside of the fixture, rather than from the outside. This is particularly the case where it is desired to effect the connection of a conduit to a panel board or the like where the space outside said panel is suitably inaccessible. For that purpose, there may be provided an ordinary form of screw bolt and nut, as shown in Fig. 6. In this form, the bolt 27 has a slotted screw head 28 and a nut 29 which is non-circular, and of such a size as to abut the side of the conduit 12, and be held against rotation while said screw head is being turned. A cam surface on the bushing cooperates with the screw head 28 to move the bushing laterally.

In Fig. 7 I have shown my improved bushing as used to connect the conduit to a form of housing comprising a second conduit formed of sheet metal, and the interior of which is inaccessible. As a feature of my invention, I provide a floor conduit 31 formed of sheet metal and embedded beneath a layer of concrete tiles or other floor surface material 33. It has a series of openings 32 disposed along the top wall thereof similar to the openings shown in Fig. 1, to receive conduit bushings which are similar to the bushings of Figs. 1 to 5.

The floor conduit may be installed in the floor with the knockout openings closed and the position of the conduit indicated on the plans of the building. Whenever it is desired to make connections through the floor for wires to a desk lamp or other fixture, the concrete may be broken away at the desired place over the conduit and the exposed knockout disk removed. One or more wires may be fished out of the conduit through the opening and through a bushing and short threaded conduit similar to the conduit 12 and the bushing 13, and this conduit secured to the wall of the floor conduit as above described. Concrete may then be filled in around the bushing and the floor leveled off.

If at any time the outlet is desired at a different position, the concrete may be chipped away from around the bushing, the latter removed, and the hole in the floor conduit plugged and covered with concrete. A new hole may be made at a different point along the floor conduit and the bushing installed at that point. The bushing above described is particularly advantageous for use with such floor conduits, the interior of which is inaccessible for any tools to tighten the bushing from the inner side of the wall or the application of a retaining member for the bushing or conduit, and where a tight joint is very important.

In Fig. 7 I have also shown a bushing which may be used with outlet boxes or other types of walled housings. In this form, in order to facilitate the manipulation of this type of conduit preliminary to tightening the bolt into position, the nut 34 has a reduced cylindrical portion 36 embraced by a coil spring 37 abutting a shoulder on the nut, and the side of the lug 17. In this way, the bolt 19 when loose may be pressed into the position shown in Fig. 5 against the action of the spring 37. After the bolt 19 has been set into the notch 14 as shown in Fig. 4, and the bushing 13 has been shifted into the opening 32, pressure on the bolt 19 is released and the bolt is automatically shifted axially by the spring into position with its head abutting against the face of the floor conduit 31. This locks the bushing in place, but thereafter the nut may be screwed down to abut the lug 17 and compress the spring around the reduced portion of the nut so as to rigidly clamp the parts.

It will be understood that in Fig. 7, the parts are shown in the position which they occupy after the nut 34 has been screwed down on to the lug 17. To insert or release the bushing, the nut must be unscrewed for a distance at least equal to the thickness of the portion of the bushing beneath the wall before the bolt may be depressed and the bushing inserted or removed. By putting a flange on the outer end of the nut 21 shown in Figs. 1 to 5, the spring may be used with that construction.

In some constructions, the bolt may have threads only at the outer end, and an ordinary square or hex nut used merely as a stop for the outer end of the spring, or the bolt need not be threaded, and may have a washer or other stop for the outer end of the spring. In such an arrangement, the spring would serve as the sole means for holding the parts in normal position, and the rigid clamping of the lug to the wall by the tightening of the nut would not be necessary.

In Figs. 8 and 9 is shown a form of bushing 40 adapted for a wall opening and for the passage therethrough of a flexible electric cord rather than for attaching a conduit to the wall. This cord may lead to a lamp or any apparatus using electric current, and passes through the bushing into a junction box where its wires are spliced or attached on to the power leads. This bushing 40 differs from the ones above described primarily in that its bore is smooth and flared rather than threaded.

As shown, the bushing is attached to a wall member 41 which may be the bottom wall of an outlet box 42. It has a smooth bore 43, the ends of which are rounded to provide a non-abrading surface for a flexible electric cord 44 spliced to the power lines coming in from a conduit 45. To support the cord and any lamp or the like suspended thereby, and to prevent the detachment of the cord from the outlet box, the cord may be provided with a knot or other enlargement shoulder or abutment which seats on the upper or inner end of the bushing 40, and which is large enough to prevent its passage through the bore 43.

The bushing 40 is similar to the construction of Fig. 7, except for the bore, and is locked by similar means. However, in Fig. 8, the cups 46 embrace the bolt 19, abut the flange 17 and the nut 34, and receive the ends of the coil spring 37, so as to center the spring and reduce frictional resistance to the rotation of the nut.

As another feature of my invention, I provide a ceiling conduit 50 adapted to carry electric wires and be secured to a ceiling. This is formed of sheet metal and includes a channel piece 51 presenting at opposite edges a pair of flanges 52 extending outwardly in opposite directions. The top of the channel is closed by a cover strip 54 secured to the flanges 52 by suitable fastening means. The flange also preferably has holes therethrough to receive nails by means of which this conduit may be attached to a ceiling. Both functions may be combined by making the fastening means in the form of eyelets 53. The side and bottom of this ceiling conduit may have knockouts, whereby openings may be formed for bushings. In Fig. 10 I have shown a bushing 40 in the bottom wall similar to that shown in Fig. 8, and a bushing in the side wall similar to that shown in Fig. 7, and at the right side of Fig. 8.

In Fig. 12 is shown a fixture stud adapted to support an electric fixture, and constructed in accordance with my invention. In this construction, the device has a main body portion 55, and locking means similar to the bushings hereinbefore described, but instead of having a central bore, it is provided with a wall stud 56. The device may be inserted in an opening in the top of an outlet box, from below or within the box after the box has been installed and the wires drawn. When in place, and locked, it will adequately support any ordinary fixture suspended therefrom.

In Fig. 13 is shown a device similar to that shown in Fig. 12 except that the stud is a female rather than a male. This stud has an internal threaded bore or socket 62 to receive the male end of an electric fixture or connecting piece.

In Figs. 1 and 2 I have shown the bushing connected to the wall of an outlet box; in Fig. 7 to the wall of a floor conduit; and in Figs. 10 and 11 to a ceiling conduit. The wall may be that of any part of an electric system to or from which may lead the wires passing through the bushing, or to the fixture supported by a fixture stud. I have used the generic term "housing" to include all such parts of an electrical installation.

Having thus described my invention, what I claim as new and desire to secure by Letters Patent is:—

1. A conduit bushing adapted to be secured to a wall member and internally threaded to receive a conduit, a flange extending from the periphery and adapted to abut one side of said wall member, said flange having a slot extending therethrough and said bushing having a groove disposed on the periphery thereof and bounded along one side thereof by said flange, said groove being disposed approximately diametrically opposite to said slot, and a screw bolt passing through said slot and having a head at one end thereof, the side of said bushing having a surface inclined in respect to the axis of the bushing, and said head engaging said surface to move the bolt radially away from said bushing and along said slot upon the axial movement of said bolt in respect to the bushing.

2. A bushing adapted to be secured to a wall member and having a lug extending from the periphery thereof, said lug having a slot disposed radially of said bushing, a screw bolt passing through said slot and having a head, a nut on said bolt, and a coil spring disposed between said nut and said lug, and encircling said bolt, said head and said bushing having interengaging surfaces for moving said bolt away from said bushing and along said slot upon the axial movement of said bolt, and said spring permitting axial movement of said bolt in said slot and the disengagement of said head and said bushing.

3. A bushing adapted to be secured in an opening in a wall and having an end portion presenting an inclined surface, an axially facing shoulder adapted to engage the outer surface of the wall, a recess between said end portion and said shoulder, a lug on the periphery of the bushing and having a radially extending slot therethrough, a bolt extending through said slot and having a head adapted to engage the inclined surface of the end portion of the bushing, and means for holding said bolt in predetermined position.

4. A bushing adapted to be secured in an opening in a wall and having an end portion presenting an inclined surface, an axially facing shoulder adapted to engage the outer surface of the wall, a recess between said end portion and said shoulder, a lug on the periphery of the bushing and having a radially extending slot therethrough, a bolt extending through said slot and having a head adapted to engage the inclined surface of the end portion of the bushing, and a coil spring for urging said bolt endwise to hold the head thereof in engagement with said inclined surface.

5. A bushing adapted to be secured in the opening in a wall, including an end portion presenting an inclined surface, a groove in the periphery adapted to receive the edge of the wall in the opening, and a bolt carried by said bushing and extending lengthwise thereof, said bolt having a head portion adapted to engage said inclined surface and the edge of said opening to prevent lateral movement of the bushing in the opening.

6. In combination, an electric outlet box having a substantially circular opening in one wall thereof, a conduit bushing in said opening and having a substantially cylindrical end portion of a maximum diameter smaller than said opening to permit said end portion to be inserted axially through said opening from the outside of the box, said bushing having an annular flange at its outer end extending radially outwardly therefrom and of a minimum diameter larger than said opening, and engaging the outside wall of said outlet box to limit inward movement of said bushing, said bushing being internally threaded to receive a conduit for circuit wires, and having at the inner end thereof a radially inwardly extending annular flange acting as a stop for the end of the conduit, the inner and end edge of said latter flange being rounded to provide a non-abrading surface with which the circuit wires passing through said conduit and into the interior of said outlet box may contact, and a pair of relatively rotatable interengaging members for locking said bushing in position, one of said members being threaded and extending through the wall of said box at a point spaced laterally from said opening and the other of said members engaging the surface of said first mentioned flange on the side thereof away from said wall, and one of said members having means at the outer end to facilitate rotation thereof by the application of a tool from the outside of the box.

7. In combination an electric housing wall having an opening therethrough substantially circular in shape with a portion extending radially therefrom, a conduit bushing extending into said opening, said bushing including an outer end portion presenting a shoulder of larger diameter than said opening and an inner end portion beyond said shoulder and of a maximum diameter less than that of the opening, whereby said bushing may be moved axially into the opening to bring said shoulder into abutting engagement with said wall, said inner end portion having a recess in one side thereof adapted to receive the edge of the wall upon the lateral movement of the bushing in the opening, a locking member carried by said outer end portion on the side thereof diametrically opposite to said recess and disposed in the radially extending portion of said opening, for locking said bushing against return lateral movement and against rotation in said opening, and a coil spring encircling said member and yieldingly resisting movement of said member in respect to said wall and said bushing.

JULIAN GORDON KNIGHT.